May 5, 1936.　　　　　G. LOENING　　　　2,039,813
RETRACTABLE LANDING GEAR
Filed Aug. 5, 1933　　　　2 Sheets-Sheet 2
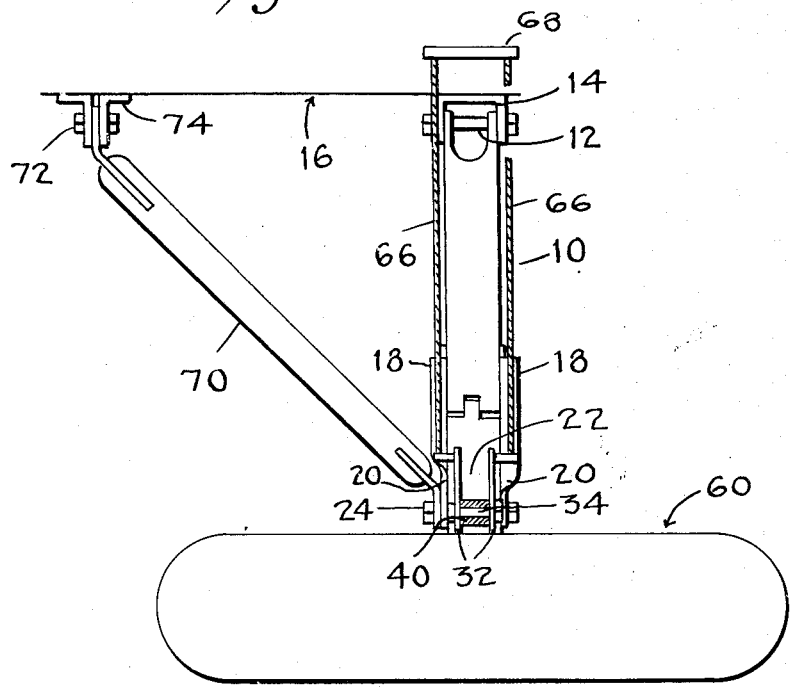
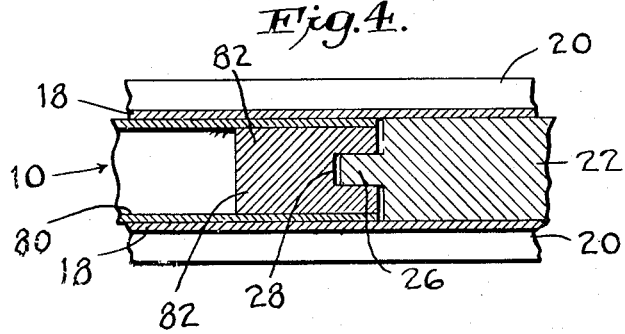
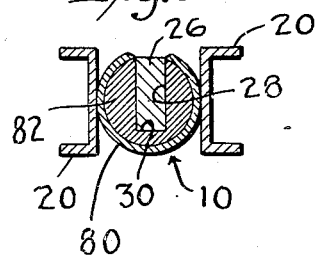
INVENTOR
BY Grover Loening
J. F. Brandenburg
ATTORNEY Patented May 5, 1936

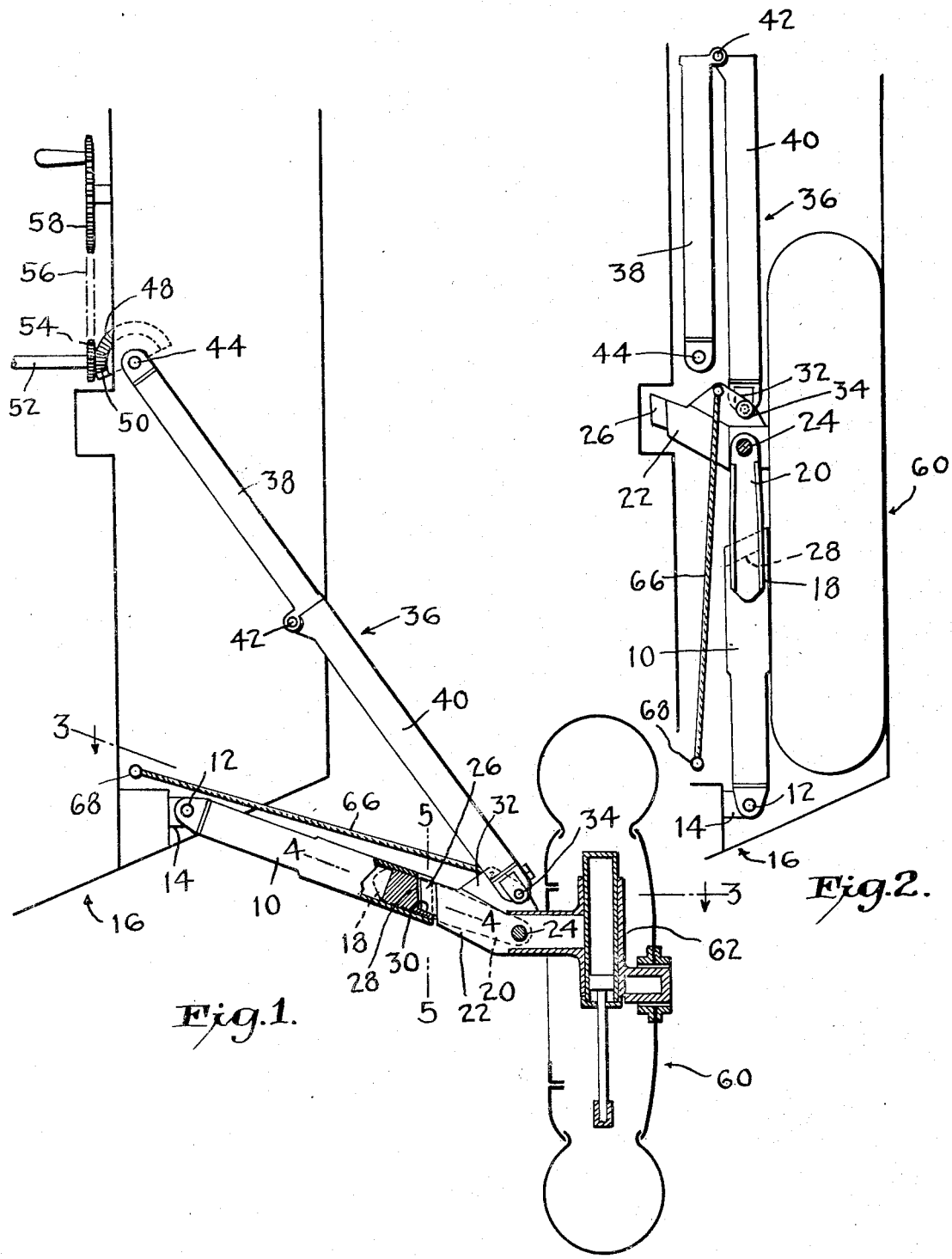

2,039,813

UNITED STATES PATENT OFFICE 2,039,813

RETRACTABLE LANDING GEAR

Grover Loening, Mill Neck, N. Y., assignor to Grover Loening Aircraft Company, Inc., Garden City, N. Y., a corporation of New York Application August 5, 1933, Serial No. 683,775

3 Claims. (Cl. 244—2)

This invention relates to retractable landing gear for aircraft.

An object of the invention is to provide an improved retractable landing gear which is economical to manufacture, reliable, and convenient and advantageous in use.

Another object of the invention is to provide a retractable landing gear in which a wheel unit is pivotally connected to a radius arm which swings to raise and lower the landing gear, and has an abutment for limiting the pivotal movement of the wheel unit and for holding it in landing position.

Another object is to provide a landing gear having a wheel unit pivotally connected to a swinging radius arm and held in landing position by a fixed-length strut which can be folded to retract the landing gear.

Another species of the invention claimed herein is disclosed in my copending application Serial No. 595,796, filed February 29, 1932 (now Patent No. 1,921,992, dated August 8, 1933).

Other objects, features and advantages of the invention will appear or be pointed out as the specification proceeds.

In the accompanying drawings, forming part hereof:

Fig. 1 is a front view, mostly in section and partly diagrammatic, showing one-half of a landing gear embodying this invention, the structure being shown in landing position;

Fig. 2 is a front elevation showing the landing gear of Fig. 1 in folded or retracted position;

Fig. 3 is a view taken on the line 3—3 of Fig. 1;

Fig. 4 is an enlarged detail sectional view along the line 4—4 of Fig. 1; and

Fig. 5 is a section along the line 5—5 of Fig. 1.

A radius arm 10 has a pivot connection 12 to a fitting 14 fixed to the airplane body 16. The radius arm can swing in a vertical plane about this pivot connection, and has a bifurcated extension formed by two channel plates 18 which are welded to the sides of the radius arm and form horns 20 projecting beyond the end of the arm.

A stub axle 22 extends between the horns 20. This stub axle is pivotally connected to the radius arm by a pin 24 extending through the axle and the horns 20.

A tongue 26 on the inner end of the stub axle 22 fits into a groove 28 in the radius arm, and the tongue 26 bottoms against an abutment 30 at the lower end of the slot to limit the pivotal movement of the stub axle with respect to the radius arm. The tongue 26 comes into contact with the abutment 30 when the gear is in landing position, as shown in Fig. 1. Instead of the abutment 30 at the lower end of the groove 28, the bottom of the groove can be made to serve as an abutment if sloped with respect to a tangent to the arc described by the tongue 26.

The stub axle 22 has upwardly extending ears 32 and a pivot connection 34 to a strut 36. This strut is foldable as a toggle and comprises upper and lower fixed length links 38 and 40, respectively, connected by an offset hinge 42. The upper end of the link 38 has a pivot connection 44 to the body of the airplane so that this link can swing in a vertical plane.

The axis of the offset hinge 42 is parallel to that of the pivot connection 44, and the hinge 42 is offset to the airplane side of the strut so that the strut folds outwardly as the landing gear is retracted. The links 38 and 40 are substantially parallel and vertical when the landing gear is retracted, as shown in Fig. 2. The principal advantage of folding the strut outwardly is that the links 38 and 40 swing away from the airplane, and it is not necessary to build the airplane with a recess for the strut to swing through, such as would be required if the strut folded inwardly. The avoidance of such recesses is particularly important in the case of hulls or pontoons of amphibian aircraft.

When the landing gear is in landing position, as shown in Fig. 1, the strut 36 is straight, and since the hinge 42 is offset, the strut is automatically locked against folding under its compression load. In its straightened position the strut 36 comprises a fixed length compression member and has no pivotal movement on either of the connections 34 and 44.

The strut 36 is folded and straightened to raise and lower the landing gear by a gear segment 48 connected with the upper end of the link 38 at its pivot connection 44. The gear segment 48 meshes with a pinion on a shaft 52. The pinion 50 is rotated by a sprocket wheel 54, which is driven by a chain 56 from a manually operated sprocket 58. The aviator turns the sprocket 58 in one direction to lower the landing gear and in the opposite direction to retract it.

A wheel 60 is carried by the stub axle 22 and a shock absorber 62 is built into the wheel. The shock absorber is shown diagrammatically in Fig. 1. A wheel having a balloon tire as its only shock-absorbing means can be used in place of the shock-absorbing wheel 60, but smoother landings are obtained with the shock absorber.

By using a fixed length strut and having the shock-absorbing means in the wheel it is possible to have the wheel substantially vertical when in landing position even though not loaded. In landing gears having compressible struts as shock absorbers, the wheels toe in sharply toward the bottom before the landing gear is fully loaded. The advantage of a vertical wheel is apparent from Fig. 1. The point of contact of the wheel 60 with the ground is well out from the pivot pin 24 so that the landing shock can be at a substantial angle to the vertical and the line of force still pass outside of the pivot pin 24. As long as this line of force passes outside of the pivot pin 24, the force tends to turn the wheel unit counterclockwise about the pin 24 and such movement is prevented by the abutment 30.

If the airplane lands across the wind with considerable leeway, or for some other reason the landing shock has a large horizontal component, so that the force against the wheel when it strikes the ground is in a line passing inside of the pivot pin 24, then the wheel unit tends to rotate in a clockwise direction about the pin 24 and tends to move the tongue 26 away from the abutment 30. Cables 66 are fastened to the airplane at 68 and the other ends of these cables are connected with the ears 32 of the stub axle. These cables hold the wheel unit from turning clockwise on the pivot pin 24 when the radius arm 10 and wheel unit are in landing position. The points of connection 68 are sufficiently above the pivot connection 12 so that the cables 66 do not prevent relative clockwise movement of the wheel unit on the pin 24 when the radius arm is swung up into a substantially vertical position, as shown in Fig. 2.

The radius arm 10 is braced against forward and aft movement by a drag link 70 (Fig. 3), which is fastened rigidly to the radius arm 10 by the pin 24. The drag link 70 has a pivot connection 72 to a fitting 74 on the airplane. The radius arm 10 and drag link 70 comprise means for guiding the movement of the wheel unit as it is raised and lowered.

Figs. 4 and 5 show enlarged detail sectional views of the tongue and slot construction and abutting surfaces of the radius arm 10 and stub axle 22. The radius arm is shown constructed from a tube 80 having a solid plug 82 closing its end. The slot 28 extends only part way through the plug 82, and the end of this slot comprises the abutment 30 with which the tongue 26 contacts to limit further pivotal movement of the stub axle.

The preferred embodiment of the invention has been described, but changes and modifications may be made, and various features of the invention used alone or in combination with other features, without departing from the invention as defined in the claims.

I claim:

1. A retractable landing gear for aircraft comprising a radius arm; a wheel unit pivotally connected to the radius arm; means for swinging the radius arm to raise and lower the wheel unit; and means to prevent pivotal movement of the wheel unit with respect to the radius arm when lowered into landing position including abutments for holding the wheel unit against movement by forces acting within a given angular range from a vertical plane, and a cable for preventing pivotal movement of the wheel unit by side thrust against the bottom of the wheel and beyond said angular range.

2. An aircraft landing gear comprising a radius arm; a wheel unit; means for swinging the radius arm to raise and lower the wheel unit; a pivot connection between the radius arm and wheel unit so that the wheel can occupy a substantially vertical position when the radius arm is raised; and means to prevent movement of the wheel unit on its pivot connection when the radius arm is in lowered position, including abutments for preventing pivotal movement in one direction and a tension member for preventing pivotal movement in the other direction.

3. In an airplane, a retractable landing gear comprising a wheel unit including shock-absorbing means, and a stub axle; means for guiding the movement of the wheel unit including a radius arm and horns extending from the radius arm and pivotally connected to the stub axle of the wheel unit; a tongue on the end of the stub axle between the horns in position to fit into a groove in the radius arm; an abutment at one end of the groove for limiting the movement of the tongue in the groove and the pivotal movement of the stub axle with respect to the horns; a strut pivotally connected to the airplane and wheel unit and comprising upper and lower fixed-length links connected together by an offset hinge on which the strut folds outward as the landing gear is moved into retracted position.

GROVER LOENING.